(12) United States Patent
Thomas et al.

(10) Patent No.: US 10,902,834 B2
(45) Date of Patent: Jan. 26, 2021

(54) THERMOPLASTIC BONDING PROCESS FOR ACOUSTICALLY TREATED LINEAR FACESHEETS

(71) Applicant: THE BOEING COMPANY, Chicago, IL (US)

(72) Inventors: Holly J. Thomas, Dorchester, SC (US); Arnold J. Lauder, Manitoba (CA); Marta B. Elleby, Charleston, SC (US); Stefan Ozog, Manitoba (CA)

(73) Assignee: THE BOEING COMPANY, Chicago, IL (US)

( * ) Notice: Subject to any disclaimer, the term of this patent is extended or adjusted under 35 U.S.C. 154(b) by 351 days.

(21) Appl. No.: 15/893,043

(22) Filed: Feb. 9, 2018

(65) Prior Publication Data

US 2019/0251943 A1 Aug. 15, 2019

(51) Int. Cl.
*G10K 11/168* (2006.01)
*B32B 5/02* (2006.01)
(Continued)

(52) U.S. Cl.
CPC .............. *G10K 11/168* (2013.01); *B32B 1/00* (2013.01); *B32B 3/12* (2013.01); *B32B 3/266* (2013.01); *B32B 5/024* (2013.01); *B32B 7/12* (2013.01); *B32B 27/12* (2013.01); *B32B 37/12* (2013.01); *B32B 37/146* (2013.01); *F02C 7/045* (2013.01); *F02K 1/827* (2013.01); *G10K 11/172* (2013.01); *B32B 2250/24* (2013.01); *B32B 2262/02* (2013.01); *B32B 2307/102* (2013.01);
(Continued)

(58) Field of Classification Search
CPC ...... G10K 11/168; G10K 11/172; B32B 1/00; B32B 3/12; B32B 3/266; B32B 5/024; B32B 7/12; B32B 27/12; B32B 37/12; B32B 37/146; B32B 2250/24; B32B 2262/02; B32B 2307/102; B32B 2371/00; B32B 2398/10; B32B 2605/18; F02C 7/045; F02K 1/827; B64D 2033/0206; F05D 2250/283

See application file for complete search history.

(56) References Cited

U.S. PATENT DOCUMENTS

| | | | |
|---|---|---|---|
| 6,371,242 B1 * | 4/2002 | Wilson | B32B 3/12 181/210 |
| 7,935,410 B2 * | 5/2011 | Orologio | B32B 27/06 156/145 |
| 2015/0315972 A1 * | 11/2015 | Lumbab | F02C 7/24 415/119 |

FOREIGN PATENT DOCUMENTS

DE 10128207 A1 * 12/2002 ............. B32B 5/245

OTHER PUBLICATIONS

Communication Pursuant to Article 94(3) EPC for EP Application No. 18208847.6 dated Nov. 25, 2019.
(Continued)

*Primary Examiner* — Forrest M Phillips
(74) *Attorney, Agent, or Firm* — Marshall, Gerstein & Borun LLP (57) ABSTRACT

A sandwich acoustic liner assembly includes a honeycomb core and a thermoplastic fabric sheet positioned in overlying relationship and structurally bonded with the honeycomb core. Further included is a method for fabricating a sandwich acoustic liner assembly which includes the steps of positioning a thermoplastic fabric sheet in overlying relationship with a honeycomb core and bonding structurally the thermoplastic fabric sheet to the honeycomb core.

20 Claims, 13 Drawing Sheets

(51) Int. Cl.

| | | |
|---|---|---|
| B32B 7/12 | (2006.01) | |
| B32B 37/12 | (2006.01) | |
| B32B 3/12 | (2006.01) | |
| B32B 3/26 | (2006.01) | |
| F02K 1/82 | (2006.01) | |
| B32B 1/00 | (2006.01) | |
| B32B 27/12 | (2006.01) | |
| B32B 37/14 | (2006.01) | |
| F02C 7/045 | (2006.01) | |
| G10K 11/172 | (2006.01) | |
| B64D 33/02 | (2006.01) | |

(52) U.S. Cl.
CPC ....... *B32B 2371/00* (2013.01); *B32B 2398/10* (2013.01); *B32B 2605/18* (2013.01); *B64D 2033/0206* (2013.01); *F05D 2250/283* (2013.01)

(56) References Cited

OTHER PUBLICATIONS

European search report for EP Application No. 18208847 dated May 6, 2019, 3 pgs.
Communication Pursuant to Article 94(3) EPC for EP Application No. 18208847.6 dated May 24, 2019.
Communication Pursuant to Article 94(3) EPC for EP Application No. 18208847.6 dated Jul. 8, 2020.
Communication Pursuant to Article 94(3) EPC for EP Application No. 18208847.6 dated Dec. 4, 2020.

\* cited by examiner

THERMOPLASTIC BONDING PROCESS FOR ACOUSTICALLY TREATED LINEAR FACESHEETS

FIELD

This disclosure relates to a noise attenuation panel and more particularly to a sandwich acoustic liner assembly with acoustic fiber material employed to attenuate noise.

BACKGROUND

Because of noise regulations governing commercial transport aircraft, high bypass engines incorporate noise attenuating panels such as sandwich acoustic liner assemblies within nacelles. These sandwich acoustic liner assemblies are positioned within a nacelle of an engine surrounding the engine and air flow associated with the engine. These sandwich acoustic liner assemblies typically include a perforated inner face sheet which is positioned within the high velocity airflow of the engine. The perforated face sheet overlies and is secured to a honeycomb core structure. In some sandwich acoustic liner assemblies the honeycomb core structure further includes a permeable material or acoustic liner material embedded within each cell of the honeycomb core structure forming an acoustic septum within each cell which is unsecured to the cell walls. An opposing or outer face sheet of the sandwich acoustic liner assembly which faces the surrounding nacelle is often non-perforated.

The fabrication of these sandwich acoustic liner assemblies are time consuming and expensive particularly with respect to positioning of the permeable material or acoustic liner material within each individual cell forming the acoustic septum. In addition, the assembling process can present undesired results with respect to the performance of the sandwich acoustic liner assembly. With use of thermoset based bonding systems for securing a thermoset honeycomb core structure to a thermoset perforated face sheet, excessive resin flow can be experienced from the low viscosity of the thermoset based bonding system during the curing process. The excessive resin flow can cause wetting of the embedded acoustic liner material which forms the acoustic septum and reduce the acoustic liner material performance. Also excessive resin flow can cause the filling in of perforations in the inner face sheet. Both of these occurrences result in reduced performance of the noise attenuation of the sandwich acoustic liner assembly.

There is a need to reduce the cost of fabricating the sandwich acoustic liner assembly for noise attenuating panels and provide strong structural bonds within the assembly without diminishing the noise attenuation performance of the assembly by way of wetting of the acoustic liner material and/or by way of filling in of perforations positioned in an inner face sheet of the assembly which is positioned within the high velocity airflow of the engine.

SUMMARY

An example includes a sandwich acoustic liner assembly which includes a honeycomb core structure and a thermoplastic fabric sheet positioned in overlying relationship and structurally bonded with the honeycomb core.

An example includes a method for fabricating a sandwich acoustic liner assembly which includes the steps of positioning a thermoplastic fabric sheet in overlying relationship with a honeycomb core and bonding structurally the thermoplastic fabric sheet to the honeycomb core.

The features, functions, and advantages that have been discussed can be achieved independently in various embodiments or may be combined in yet other embodiments further details of which can be seen with reference to the following description and drawings.

DESCRIPTION

As discussed earlier, there is a need to reduce the cost of fabricating sandwich acoustic liner assemblies used for noise attenuating panels. In addition there is a need to provide strong structural bonds within the assembly without diminishing the noise attenuation performance of the assembly. The diminishment in noise attenuation performance of the assembly has occurred as a result of using a thermoset bonding system which imparted excessive flow during curing. The excessive flow during curing causes unwanted wetting of the acoustic liner material which diminishes the performance of the acoustic liner. Additionally the excessive flow tends to fill perforations positioned in an inner face sheet of the sandwich acoustic liner assembly which is positioned within the nacelle within the high velocity airflow of the engine. The closing of these perforations also reduces the performance of the noise attenuating panels.

The disclosure set forth herein will reduce the cost of fabricating a sandwich acoustic liner assembly and employs a bonding system which avoids unwanted excessive flow during curing and provides needed structural mechanical strength.

Figure 1:
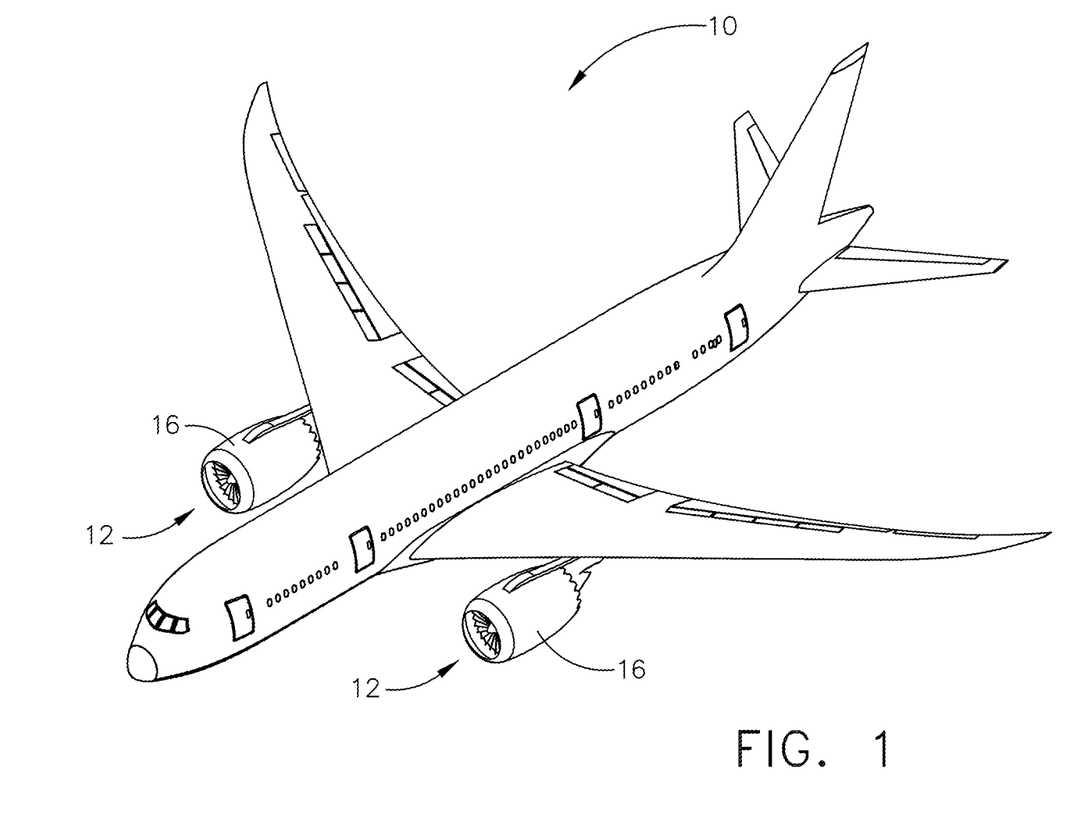
FIG. 1 is a perspective view of an aircraft.
Figure 12:
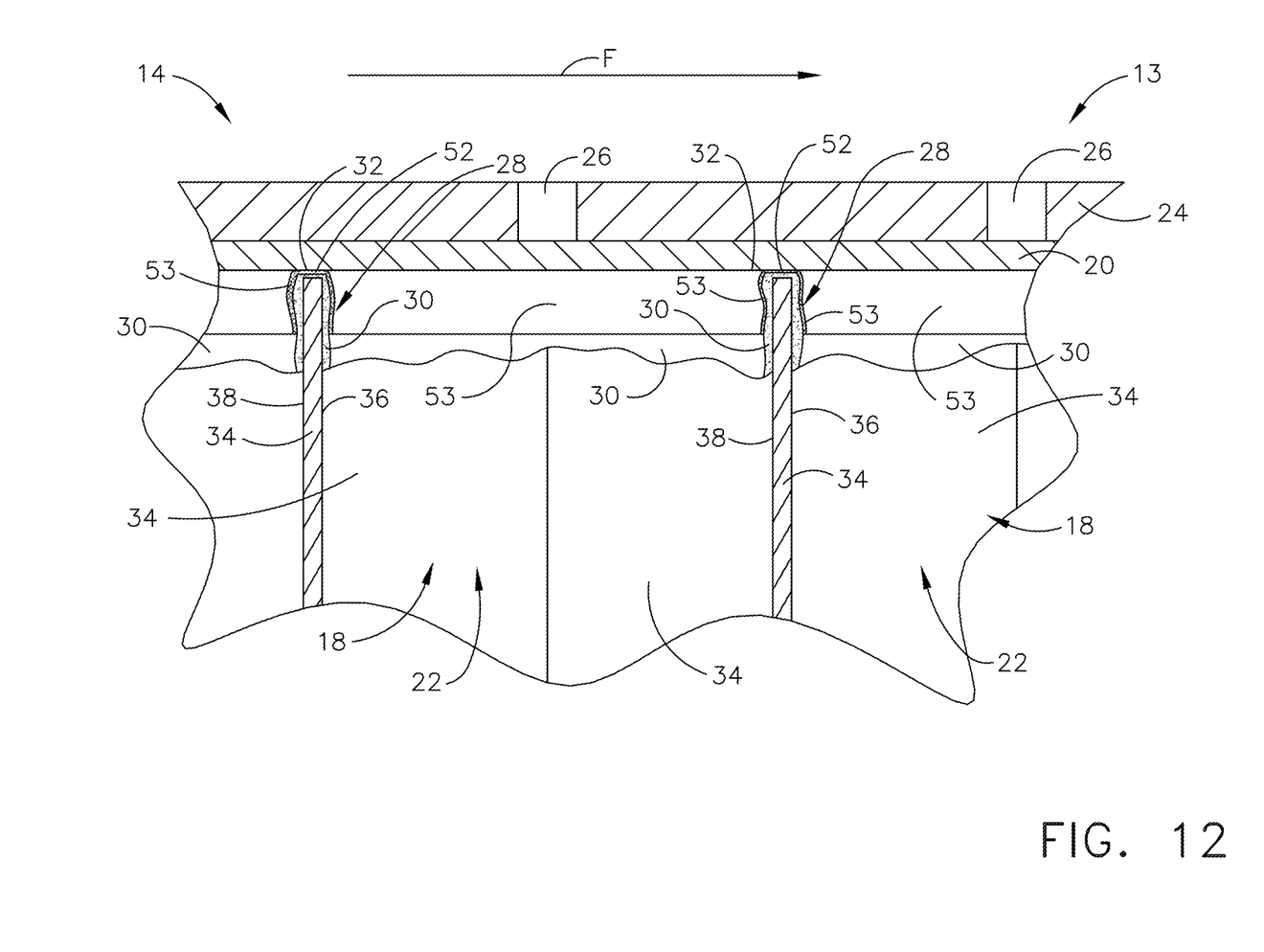
FIG. 12 is a partial cross section view taken along line 12-12 of FIG. 5 with a face sheet positioned overlying a thermoplastic fabric sheet which is positioned overlying the adhesive sheet material carrying the thermoplastic material positioned on the honeycomb core.
Figure 13:
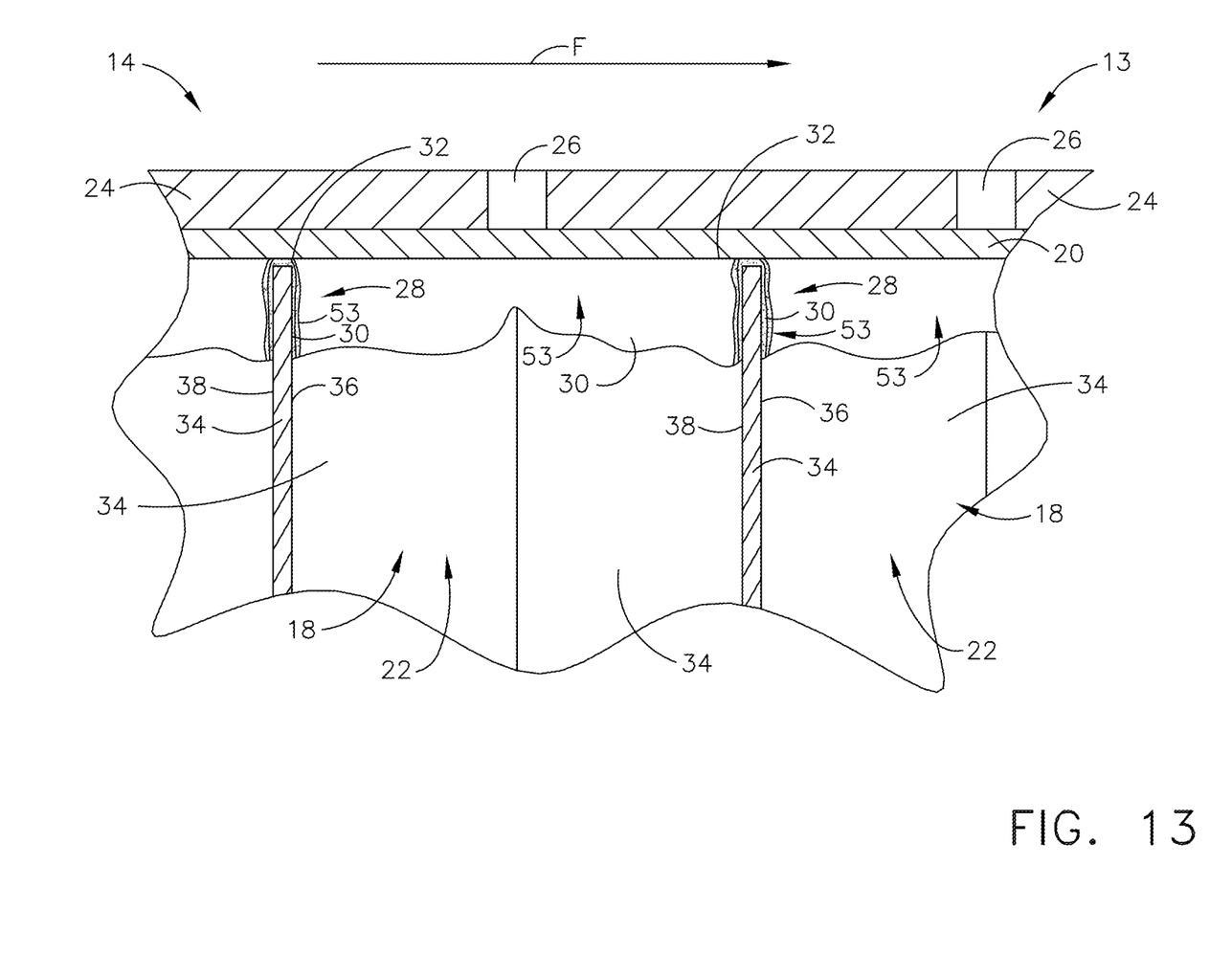
FIG. 13 is a partial cross section view taken along line 13-13 of FIG. 7 with a face sheet positioned overlying a thermoplastic fabric sheet which is positioned overlying the adhesive sheet material carrying the thermoplastic material positioned on the honeycomb core.

In referring to FIG. 1, aircraft 10, such as used in commercial transport, include high by-pass engines 12. In attenuating sound generated by engines 12, noise attenuation panels 13 such as sandwich acoustic liner assemblies 14, as seen in FIGS. 12 and 13 are positioned within the interior of nacelle 16 of each engine 12. Sandwich acoustic liner assemblies 14 are positioned within nacelle 16 surrounding engine 12 and air flow F associated with engine 12. The performance of sandwich acoustic liner assembly 14 is particularly useful for sound reduction when aircraft 10 is within the vicinity of an airport. Assemblies 14 provide helpful sound attenuation with demands placed on engines 12 such as at the time of powering up for lift at take-off and at the time of landing with engines 12 placed in a reverse thrust configuration to slow down aircraft 10.

Figure 2:
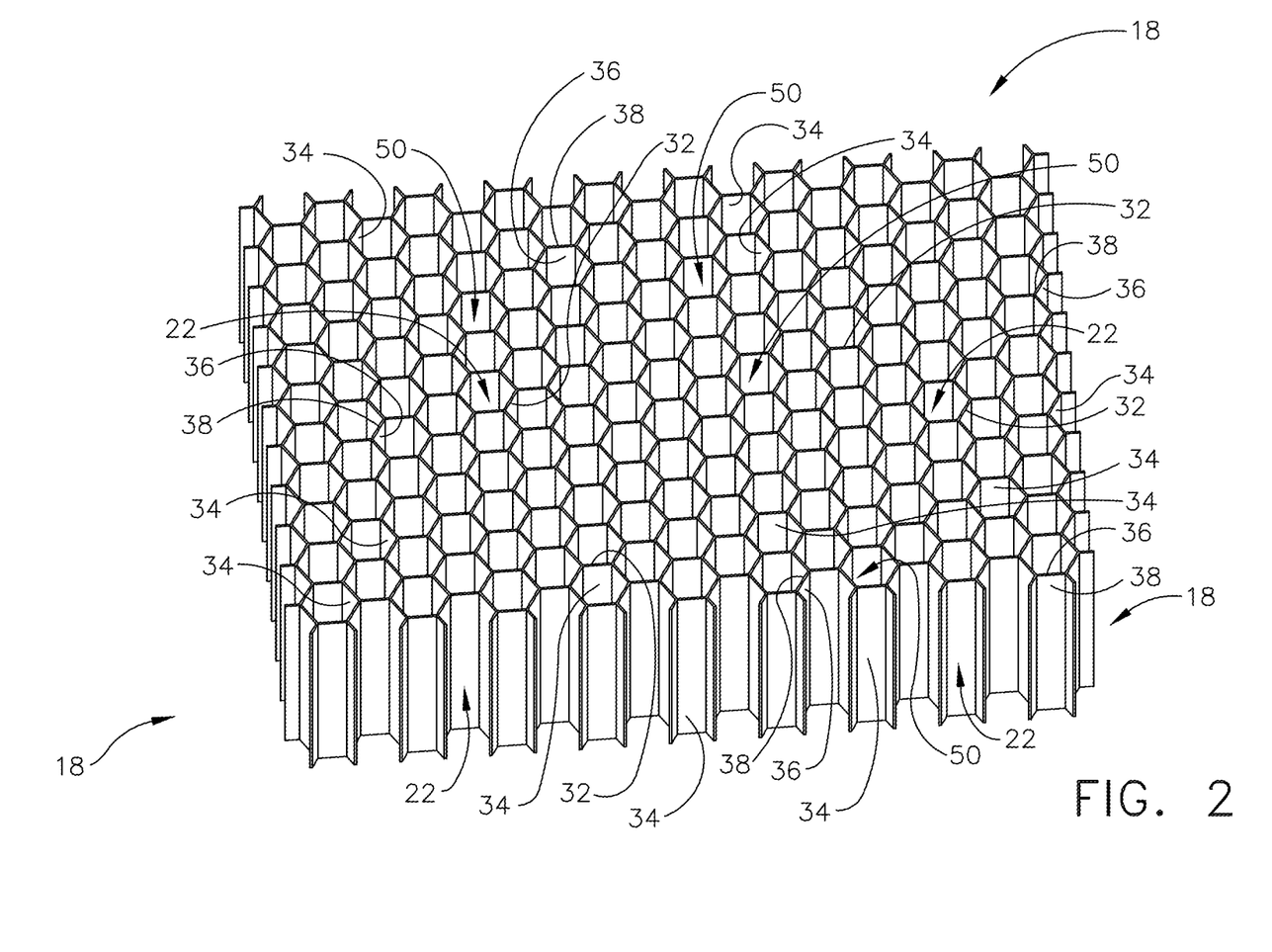
FIG. 2 is a partial perspective view of a honeycomb core for a sandwich acoustic liner assembly.

Sandwich acoustic liner assembly 14 includes honeycomb core 18, as seen in FIG. 2 and includes thermoplastic fabric sheet 20 positioned in overlying relationship with the honeycomb core 18 as seen in FIGS. 8 and 10-13. Honeycomb core 18 is constructed of, in this example, thermoset material. Thermoplastic fabric sheet 20, which provides acoustic attenuation is constructed of woven thermoplastic filaments which for example include polyetheretherketone and other suitable materials and is positioned in a sheet or layer form in overlying relationship with honeycomb core 20. The application of thermoplastic fabric sheet 20 is a simpler, more direct and inexpensive application of the acoustic material for a sandwich acoustic liner assembly in contrast to positioning the material within each cell 22 of honeycomb core 20.

Figure 9:
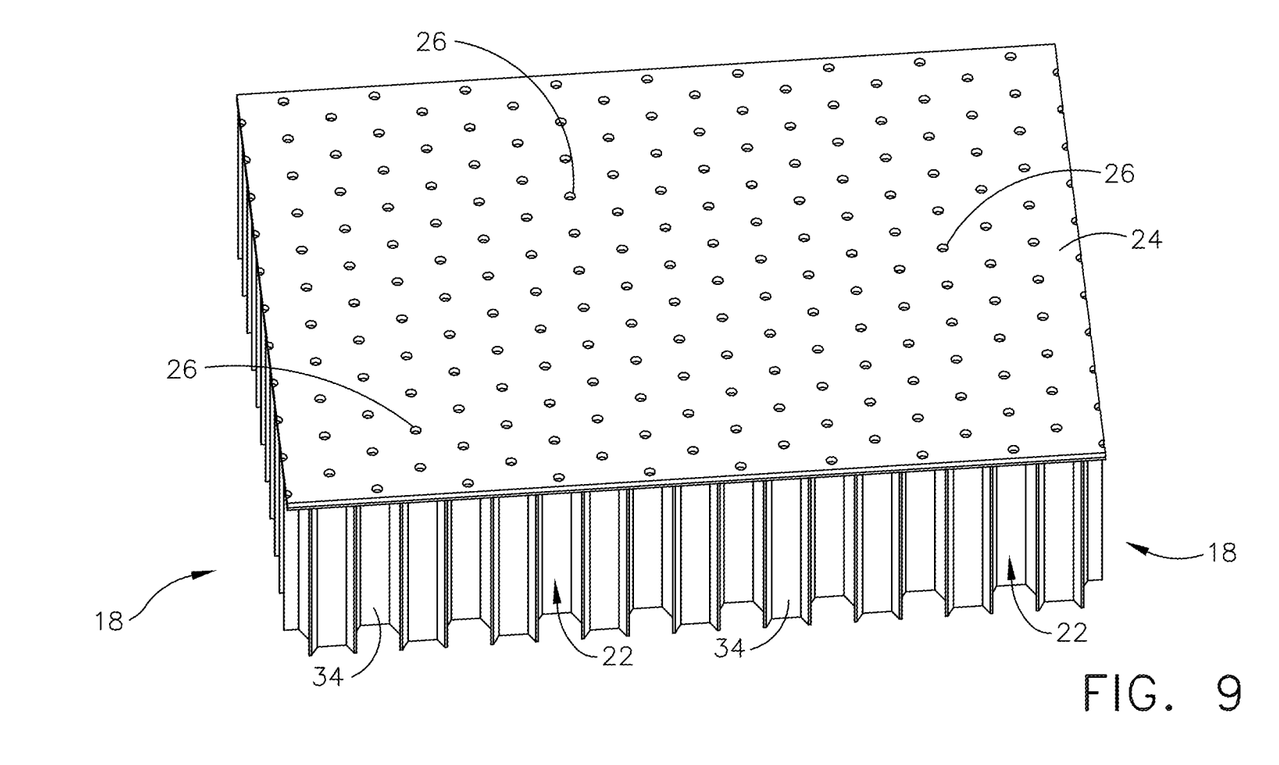
FIG. 9 is the partial perspective view of FIG. 8 with a face sheet positioned overlying the thermoplastic fiber sheet.
Figure 14:
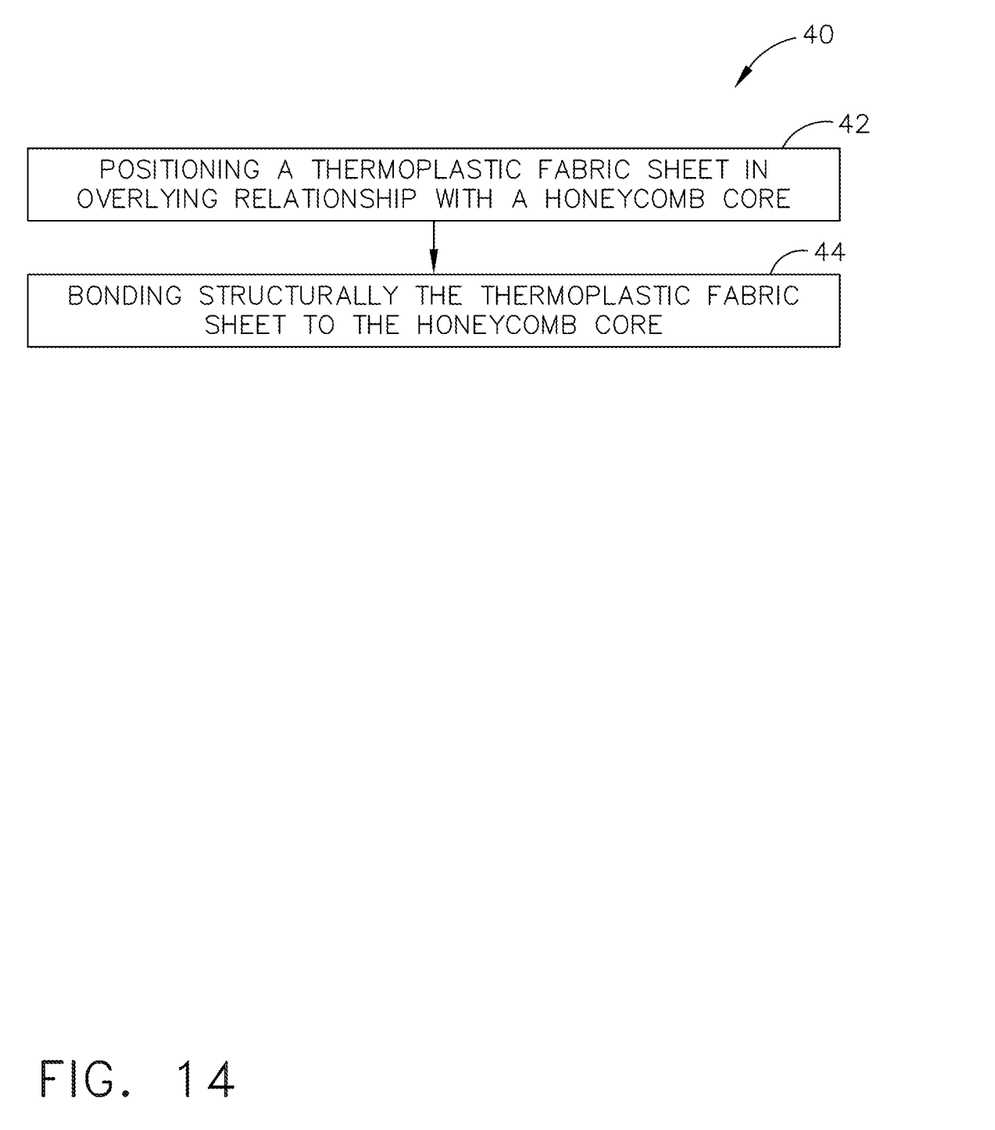
FIG. 14 is a flow chart for a method for fabricating a sandwich acoustic liner assembly.

Sandwich acoustic liner assembly 14 further includes face sheet 24, as seen in FIGS. 9-13. Face sheet 24, in this example, is constructed of thermoset material and can be constructed of other materials selected from one of a number of materials providing the needed structural strength. Face sheet 24 includes plurality of perforations 26 extending through face sheet 24 wherein perforations 26 are positioned facing airflow F, which is associated with engines 12, as seen in FIGS. 13 and 14. Perforations 26, as shown in FIG. 9, are circular in configuration, however the configuration of perforations 26 can be one of a variety of shapes including slotted in configuration. Face sheet 24 is positioned in overlying relationship to thermoplastic fabric sheet 20 such that thermoplastic fabric sheet 20 is positioned between face sheet 24 and honeycomb core 18, as seen in FIGS. 10-14.

Figure 10:
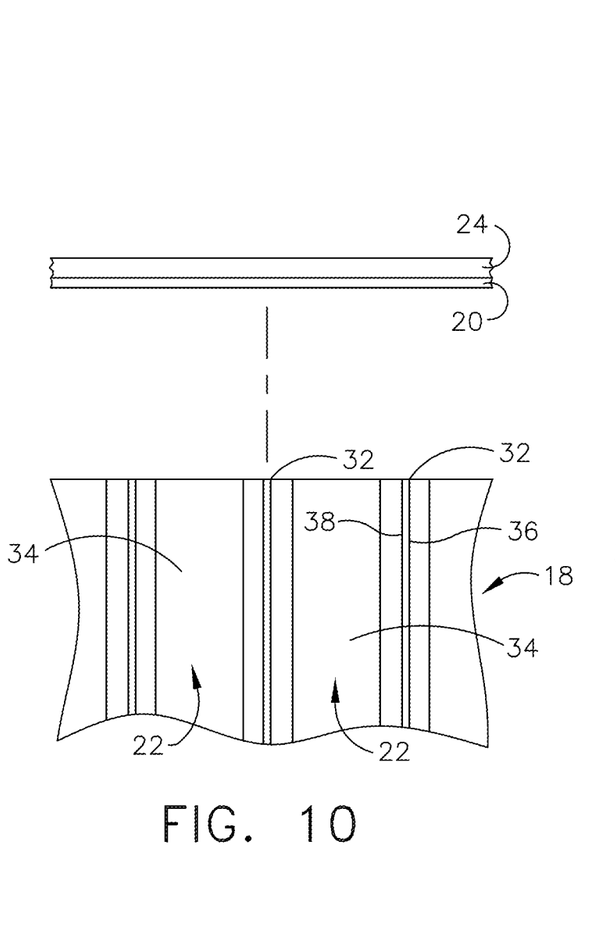
FIG. 10 is a partial exploded cross section view of face sheet and thermoplastic fiber sheet secured together prior to being positioned to overlie the honeycomb core.

In one configuration of the fabrication of sandwich acoustic liner assembly 14, thermoplastic fabric sheet is 20 is secured to face sheet 24, as seen in FIG. 10, with an adhesive (not shown). This adhesive can be selected as one from a variety of adhesives such as for example epoxy-based adhesives, bismaleimide adhesives or other suitable adhesives. Alternatively thermoplastic fabric sheet 20 is secured to face sheet 24, as seen in FIG. 10, with a portion of thermoplastic fabric sheet 20 fused (not shown) by way of melting together thermoplastic fabric sheet 20 and face sheet 24 at discrete locations.

For securement of thermoplastic fabric sheet 20 to honeycomb core 18 bond assembly 28, as seen in FIGS. 12 and 13, is positioned between thermoplastic fabric sheet 20 and honeycomb core 18. Bond assembly 28 includes adhesive sheet material 30 positioned overlying edge surface 32 of cell wall 34 of honeycomb core 18. Adhesive sheet material 30 originates, as discussed in more detail below from adhesive sheet 46 which can be selected from a variety of adhesive sheets which include for example epoxy-based sheets or other suitable adhesive sheets. Adhesive sheet material 30 extends from edge surface 32 of cell wall 34 onto first side surface 36 of cell wall 34 adjacent edge surface 32 of cell wall 34 and extends from edge surface 32 of cell wall 34 onto second opposing side surface 38 of cell wall 34 adjacent edge surface 32 of cell wall 34. This positioning of adhesive sheet material 30 in this configuration will be explained in more detail herein below.

Bond assembly 28 further includes thermoplastic material such as for example polyvinylidene fluoride ("PVDF") or polyetherimide ("PEI") or other suitable materials positioned in overlying relationship to adhesive sheet material 30 positioned on edge surface 32 of cell wall 34 of honeycomb core 18. Thermoplastic material in this example is also in overlying relationship to adhesive sheet material 30 which is positioned on first side surface 36 and the second side surface 38 of cell wall 34. The positioning of the thermoplastic material in overlying relationship to adhesive sheet material 30 will be explained in more detail herein. Similarly, the positioning of epoxy sheet material 30 in relationship to honeycomb core 18 will also be explained in more detail herein as well.

Figure 11:
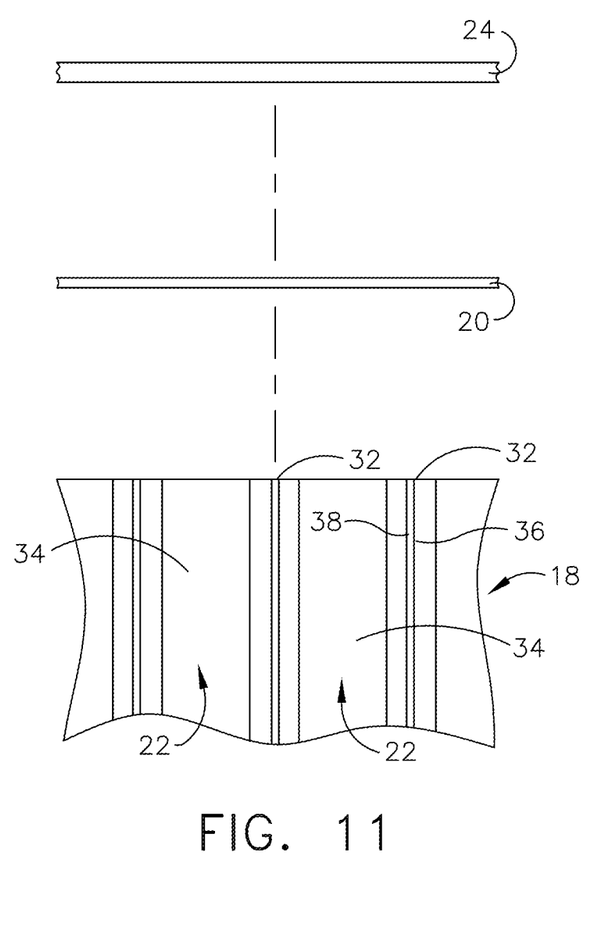
FIG. 11 is a partial exploded cross section view of face sheet and thermoplastic fiber sheet being positioned in overlying relationship to the honeycomb core separately from the face sheet.

Method 40, as seen in FIG. 14, for fabricating a sandwich acoustic liner assembly 14 includes step 42 of positioning thermoplastic fabric sheet 20 in overlying relationship with honeycomb core 18 and step 44 of bonding structurally thermoplastic fabric sheet 20 to honeycomb core 14. In method 40 there are a two examples of step 42 of positioning thermoplastic fabric sheet 20 into overlying relationship with honeycomb core 14. As described earlier and as seen in FIG. 10 step 42 of positioning further includes a first example which includes a step of securing thermoplastic fabric sheet 20 to face sheet 24. Face sheet 24 is constructed of a thermoset material wherein face sheet 24 defines plurality of perforations 26, as seen in FIGS. 9 and 12, which extend through face sheet 24 as discussed earlier. In this first example, the step of securing includes a step of one of positioning an adhesive, as mentioned earlier, (not shown) between face sheet 24 and thermoplastic fabric sheet 20 or by way of fusing (not shown) by application of heat to discrete locations with respect to thermoplastic fabric sheet 20 and face sheet 24. In this fashion, face sheet 24 is secured together with thermoplastic fabric sheet 20 prior to positioning thermoplastic fabric sheet 20 in overlying relationship with honeycomb core 18. A second example of positioning thermoplastic fabric sheet 20 into overlying relationship with honeycomb core 18 is shown in FIG. 11 wherein thermoplastic fabric sheet 20 is positioned in overlying relationship with honeycomb core 18 separately from positioning face sheet 24 in overlying relationship to thermoplastic fabric sheet 20.

Figure 3:
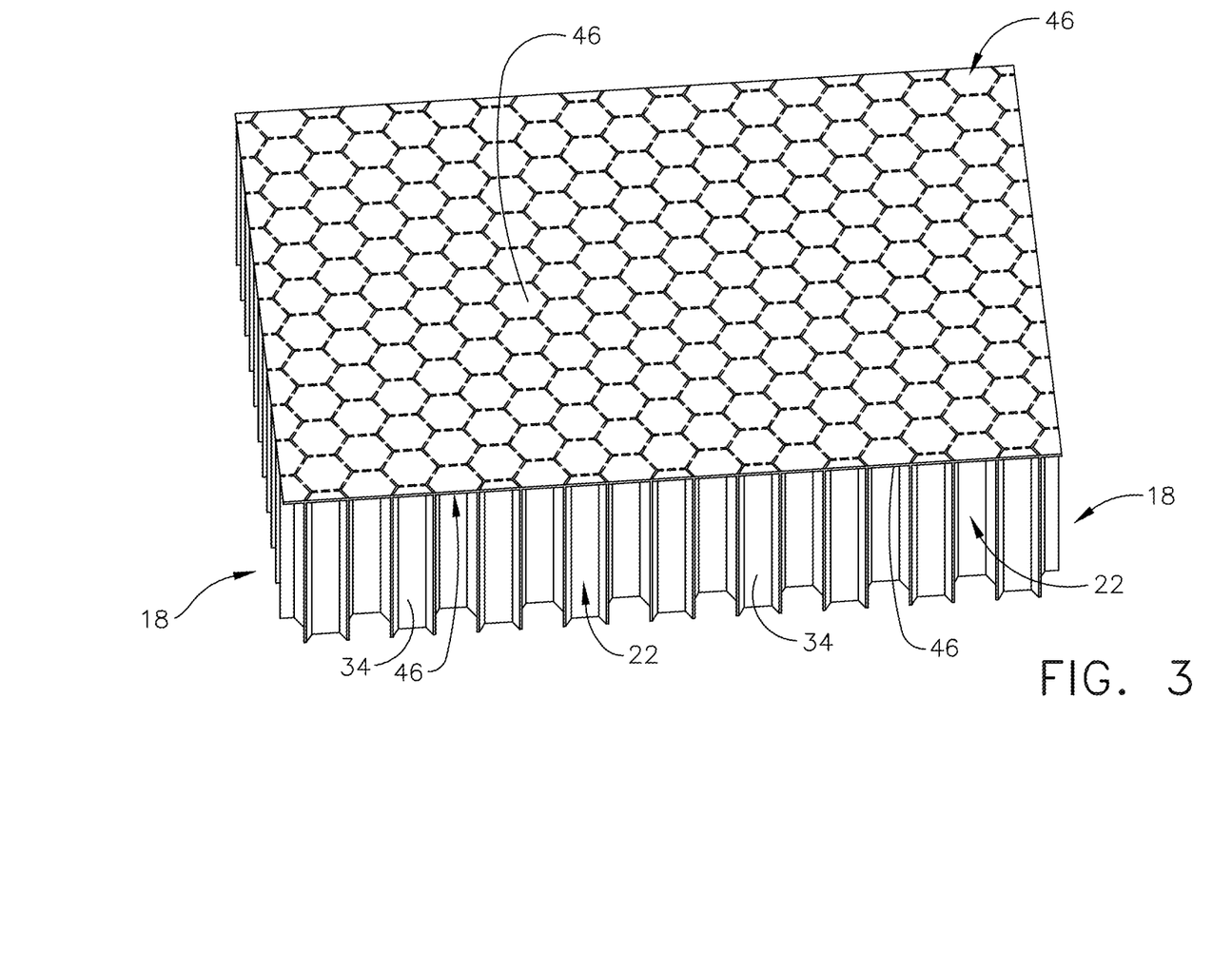
FIG. 3 is the view of FIG. 2 with an adhesive sheet positioned in overlying relationship with the honeycomb core.

Method 40 for fabricating the sandwich acoustic liner assembly 14 which includes step 44 of bonding structurally further includes a step of positioning adhesive sheet 46, as earlier mentioned, in overlying relationship with honeycomb core 18, as seen in FIG. 3, prior to step 42 of positioning thermoplastic fabric sheet 20 in overlying relationship with honeycomb core 18. Method 40 for fabricating the sandwich acoustic liner assembly 14 which includes step 44 of bonding structurally which further includes a step of heating adhesive sheet 46, prior to step 42 of positioning thermoplastic fabric sheet 24. Heating in this example includes application of heat from a localized heat source being moved across adhesive sheet 46. The heat reaches a temperature in a range between approximately one hundred and ninety five degrees Fahrenheit and approximately two hundred and twenty five degrees Fahrenheit (195° F. to 225° F.). With adhesive sheet reaching this temperature, a bubbling of the adhesive sheet 46 occurs and the resulting bubbles burst resulting in adhesive sheet material 30 being applied to edge surface 32 of wall 34 of cells 22 as well as on portions of first side surface 36 and second side surface 38 of walls 34 of cells 22, wherein these locations are identified in FIG. 2 with adhesive sheet material 30 being applied thereon as seen in FIG. 4.

Figure 4:
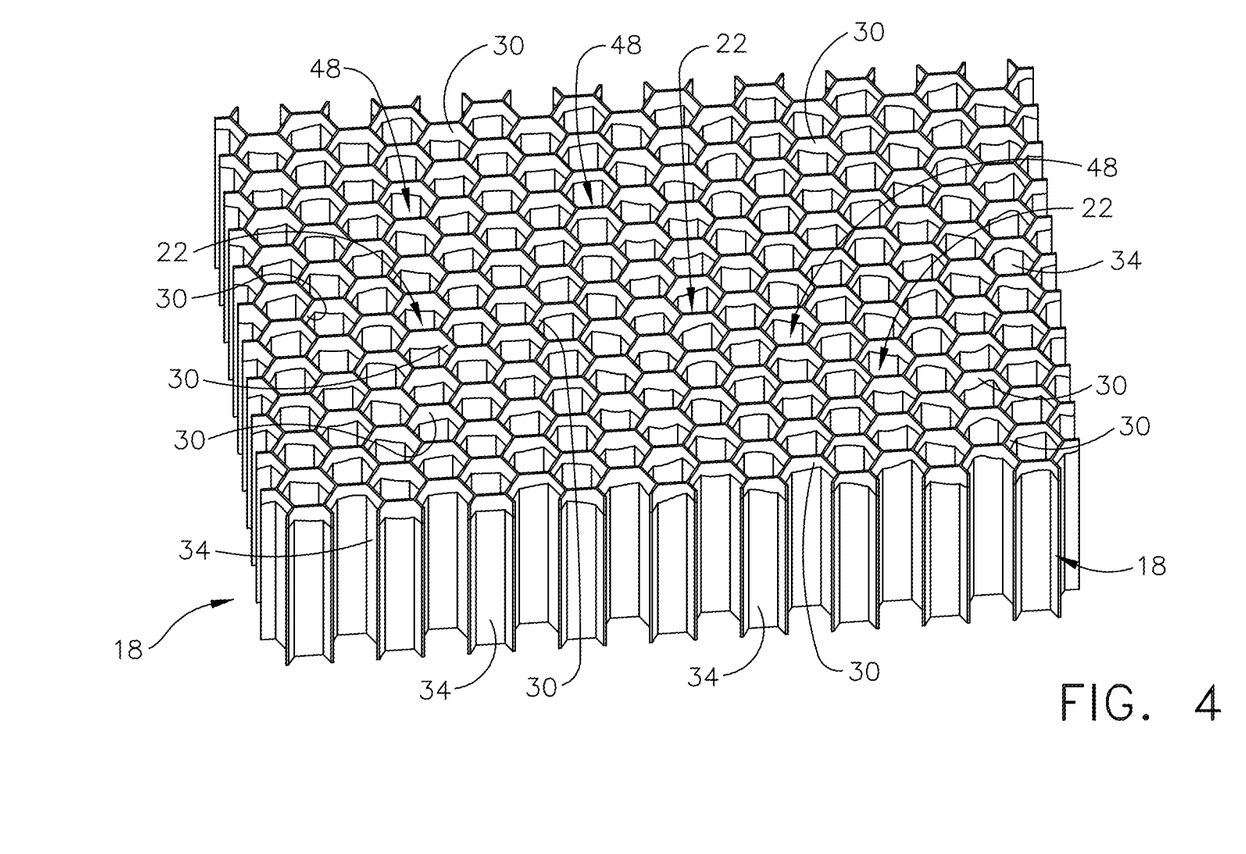
FIG. 4 is a view of FIG. 3 wherein the adhesive sheet has been heated and adhesive sheet material of the adhesive sheet coats edge surfaces of each wall forming each cell of the honeycomb core structure and coats portions of first and second opposing side surfaces adjacent to the edge surface of each wall in each cell.

Adhesive sheet 46, as seen in FIG. 3, through the heating as mentioned above, results in an altering of the configuration of adhesive sheet 46, as seen in FIG. 4, such that adhesive sheet 46 of FIG. 3 results in defining an opening 48 through adhesive sheet 46 of FIG. 4. Opening 48 is aligned with opening 50, as seen in FIG. 2, wherein opening 50 is defined by walls 34 which form cell 22 of honeycomb core 18, as identified in FIG. 2. In this example, there are a plurality of openings 48 within adhesive sheet 46 wherein each opening 48 aligns with a corresponding opening 50 defined by walls 34 defining each cell 22 of honeycomb core 18. As mentioned above, an alteration of the configuration of adhesive sheet 46 occurs, adhesive sheet material 30 from adhesive sheet 46 results in adhesive sheet material 30 overlying edge surface 32 of wall 34 wherein walls 34 form cell 22, as seen in FIG. 2, of honeycomb core 18. With this alteration of the configuration of adhesive sheet 46, adhesive sheet material 30 from adhesive sheet 46 also overlies at least a portion of first side surface 36 adjacent edge surface 32 of wall 34 and second opposing side surface 38 adjacent edge surface 32 of wall 34. This covering by adhesive sheet material 30, in this example, covers all of edge surfaces 32 and portions of first and second side surfaces of walls 34 of each cell 22.

Figure 5:
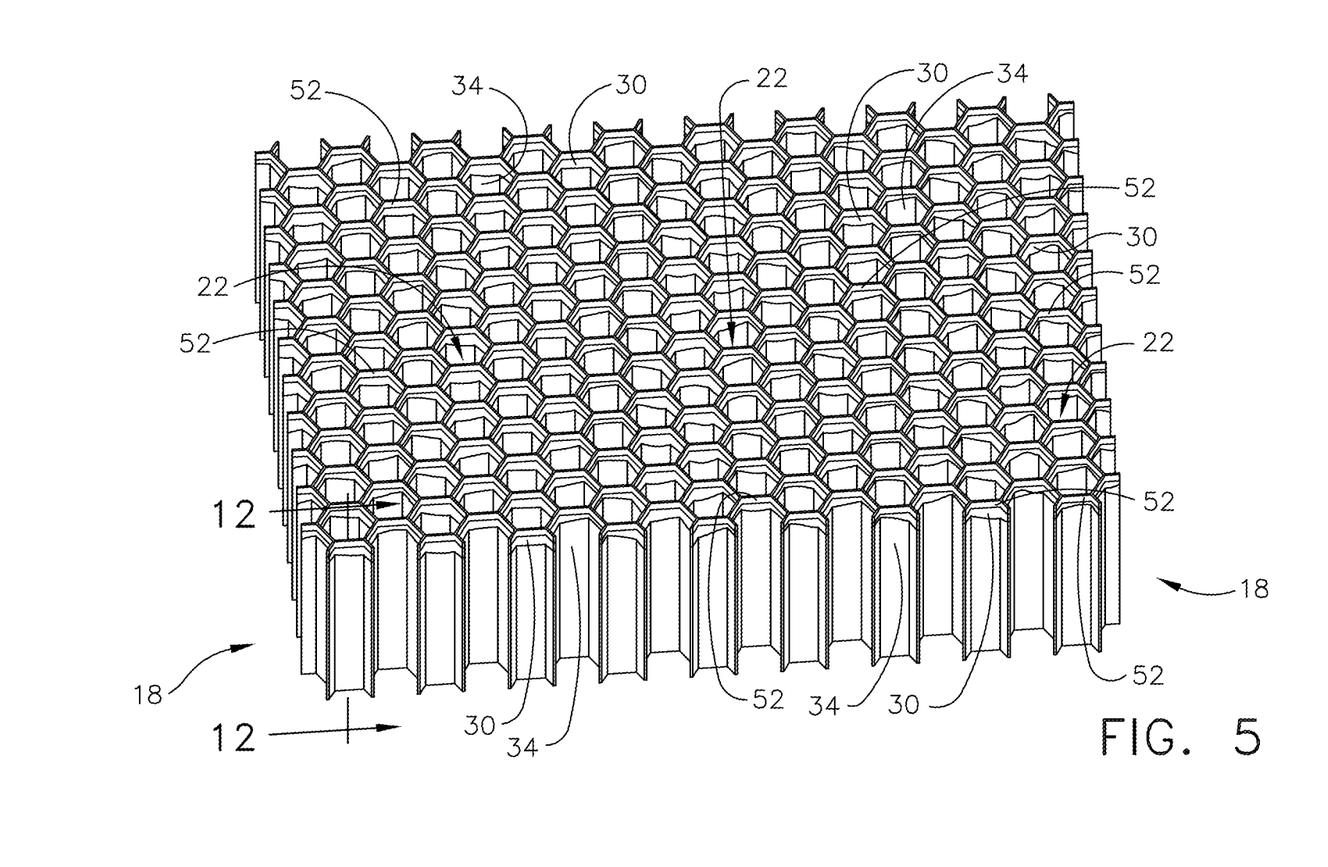
FIG. 5 is a view of FIG. 4 wherein a slurry which includes a thermoplastic material and a solvent has been applied onto the adhesive material positioned on the edge surfaces of each wall forming each cell and on at least a portion of the adhesive material positioned on the first and second opposing side surfaces adjacent to the edge surface of each wall in each cell, wherein solvent within the slurry has flashed.

Method 40 for fabricating the sandwich acoustic liner assembly 14 includes two examples with respect to the step 44 of bonding structurally which includes in one example positioning a slurry 52, as seen in FIG. 5, which includes a mixture of a powder of thermoplastic material and a solvent. The solvent can be selected from one of a variety of suitable solvents, such as isopropyl alcohol, acetone or N-Methyl-2-pyrrolidone ("NMP") onto the adhesive sheet material 30, prior to the step of positioning thermoplastic fabric sheet 20. In one example, wherein the epoxy sheet 46 has been altered in configuration, as seen in FIG. 4, the slurry is applied to adhesive sheet material 30 by one of a number of ways such as dipping, brushing, rolling, etc. In this example, slurry 52 is applied to adhesive sheet material 30 positioned overlying edge surface 32 and on at least a portion of adhesive sheet material 30 positioned on first side surface 36 and second opposing side surface 38. With slurry 52 applied onto adhesive sheet material 30, the solvent from slurry 52 flashes leaving the thermoplastic material 53, as seen in FIG. 5, remaining on and carried by adhesive sheet material 30. In this example, an application of slurry 52 is prior to the step of positioning 42 thermoplastic fabric sheet 20, such that with step 42 of positioning thermoplastic fabric sheet 20 in overlying relationship with honeycomb core 18 thermoplastic fabric sheet 20 is positioned overlying thermoplastic material 53 carried by adhesive sheet material 30, such as seen in FIG. 12.

With sandwich acoustic liner assembly 14 assembled, including in this example having face sheet 24 positioned overlying thermoplastic fabric sheet 20, bonding assembly 28 is positioned between thermoplastic fabric sheet 20 and honeycomb core 18 and an opposing face sheet (not shown) positioned on an opposing side of honey comb core 18 proximate to nacelle 16 than face sheet 24, the assembly is bagged, vacuumed and cured which results in curing thermoplastic fabric sheet 20 and adhesive sheet material 30 carrying thermoplastic material 53. A desired structural bonding occurs with respect to thermoplastic fabric sheet 20 and honeycomb core 18 providing a sandwich acoustic liner assembly 14. This liner is less expensive to fabricate based on this process and bond assembly 28, which includes the adhesive sheet material 30 and thermoplastic material 53, avoids unwanted wetting of thermoplastic fabric sheet 20 and avoids blockage of perforations 26 of face sheet 24 and forms a desired structural bond.

Figure 6:
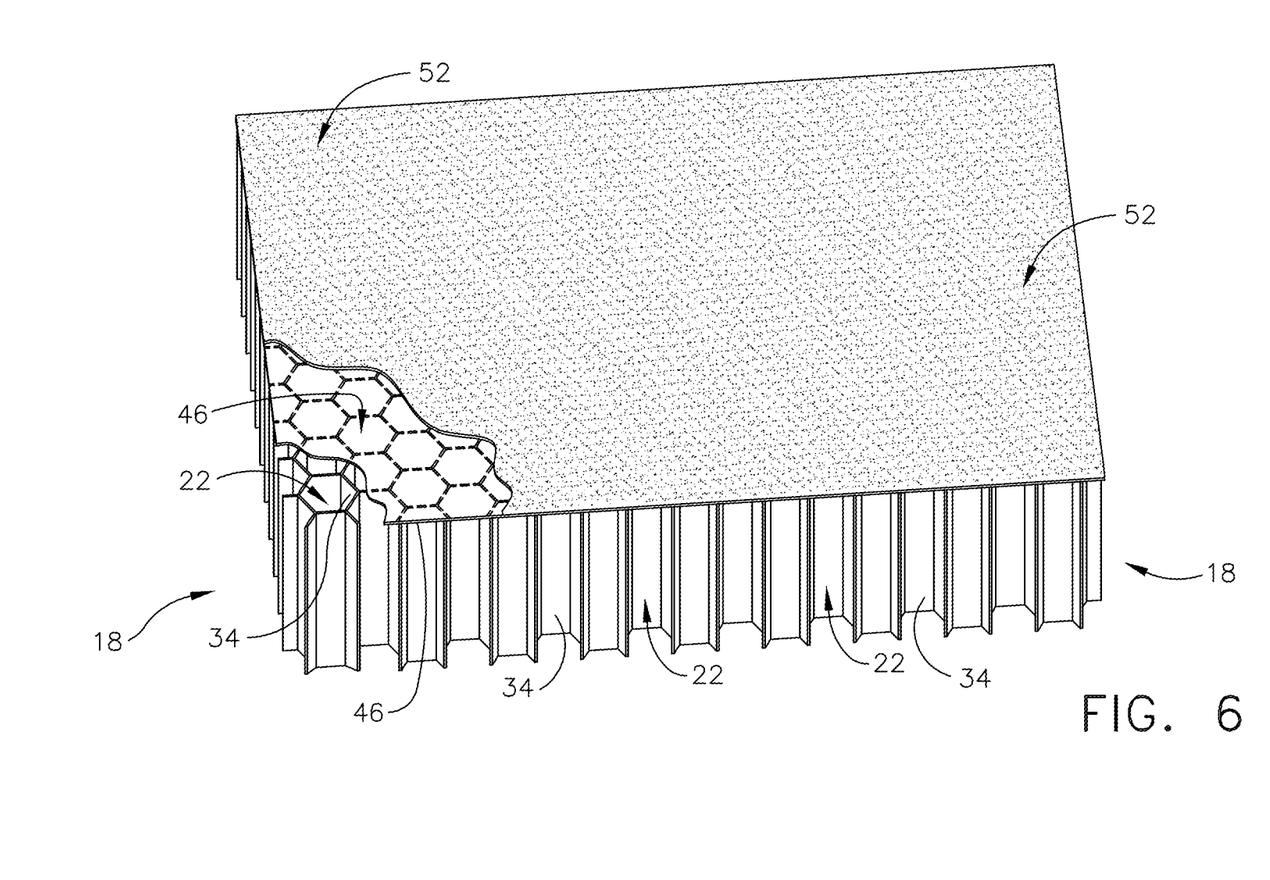
FIG. 6 is a view of the honeycomb core with a partial broken away view of an adhesive sheet positioned overlying the honeycomb core and a slurry containing a solvent and thermoplastic material which has been applied onto the adhesive sheet.

Method 40 for fabricating the sandwich acoustic liner assembly 14 includes a second example wherein step 44 of bonding structurally further includes step of applying slurry 52, of a mixture of thermoplastic material and solvent onto adhesive sheet 46 as seen in FIG. 6, prior, in this example, to step 42 of positioning thermoplastic fabric sheet 20. As mentioned above, the solvent flashes from slurry 52 leaving thermoplastic material 53 remaining on adhesive sheet 20.

Figure 7:
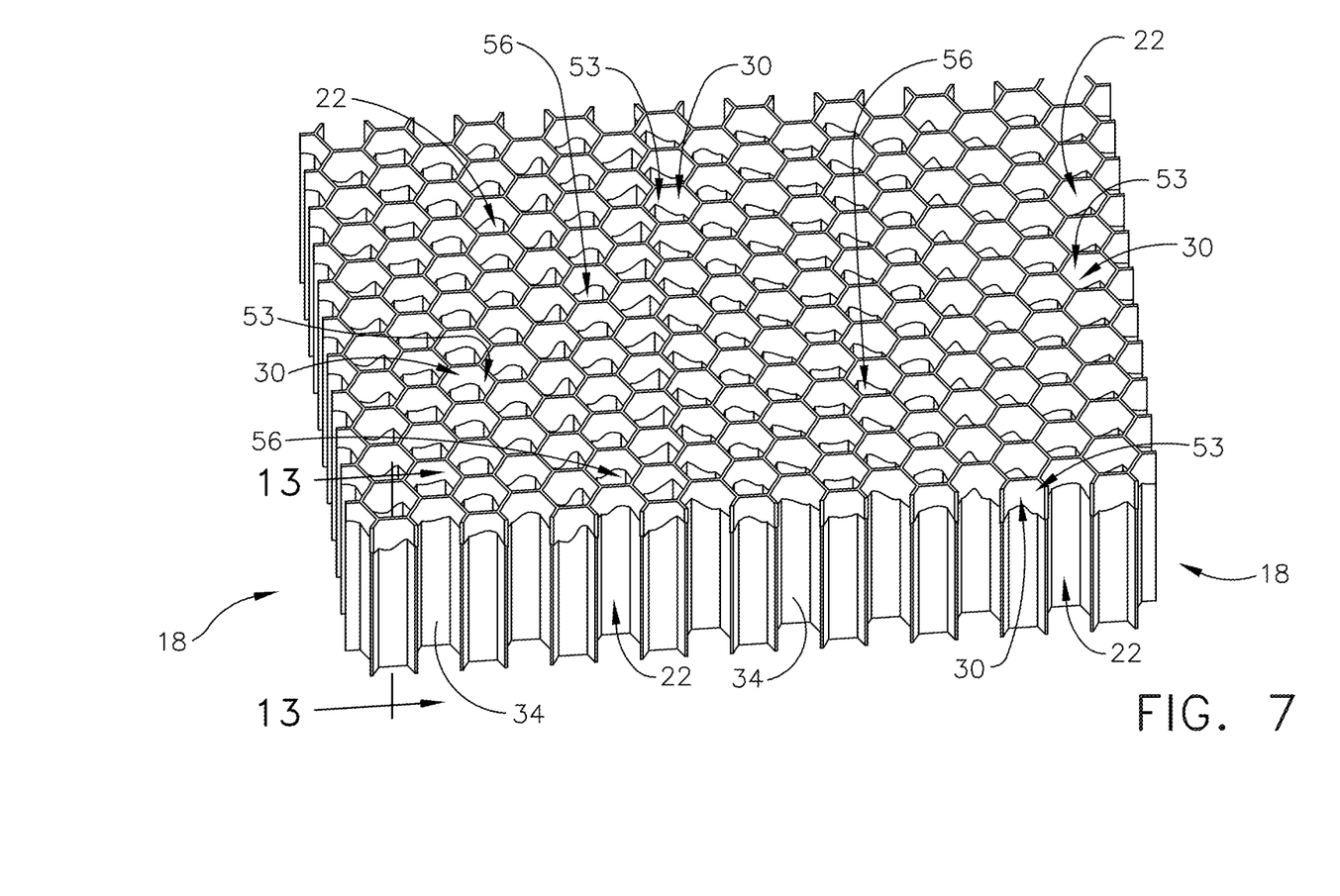
FIG. 7 is the partial perspective view of FIG. 6 wherein the adhesive sheet carrying a coating of the slurry containing the thermoplastic material has been heated and has coated edge surfaces of each wall forming each cell within the honeycomb core and portions of first and second side surfaces adjacent to the edge surface of each wall in each cell and the solvent within the slurry has flashed.
Figure 8:
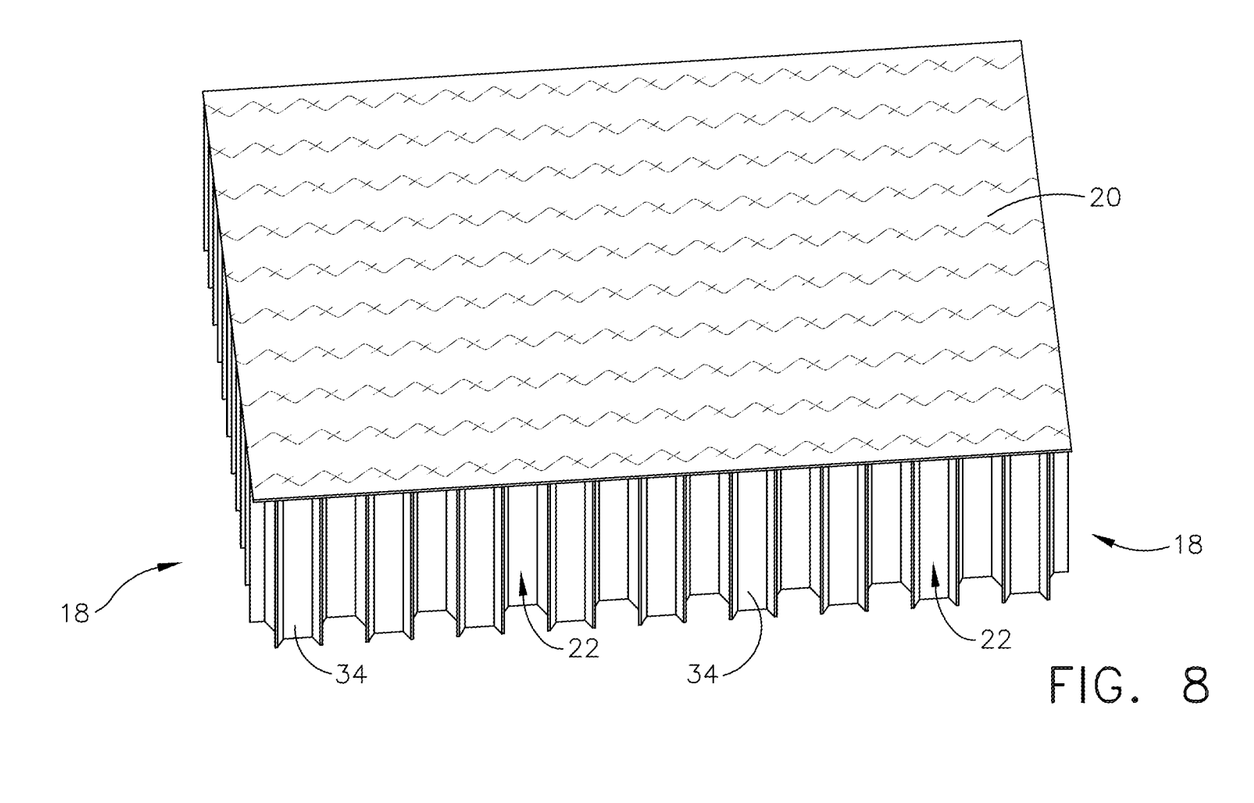
FIG. 8 is a partial perspective view of the honeycomb core of either FIG. 5 or FIG. 7 with a thermoplastic fiber sheet overlying the adhesive sheet material and the thermoplastic material carried by the adhesive sheet material positioned on the honeycomb core.

Prior to step 42 of positioning thermoplastic fabric sheet 20, step 44 of bonding structurally further includes a step of heating adhesive sheet 30 carrying thermoplastic material 53 occurs as similarly described above in this example with the use of a localized heat source. As a result, the alteration of the configuration of the adhesive sheet 46 carrying thermoplastic material 53 forms openings 56, as seen in FIG. 7, which are aligned with opening 50 defined by walls 34 which form cells 22 of honeycomb core 18, as seen in FIG. 2. In this second example, thermoplastic material 53, overlies adhesive sheet material 30, as seen in FIG. 13.

Slurry 52 as mentioned above and seen in FIG. 6 can be applied by any one of the above mentioned techniques. The solvent flashes from slurry 52 as mentioned above in the first example. Thus as shown in the present example in FIGS. 7 and 13, adhesive sheet material 30 and thermoplastic material 53 are shown coextensively positioned on honeycomb core 18. Adhesive sheet material 30 from adhesive sheet 46 carrying thermoplastic material 53 overlies edge surface 32 of wall 34 of cell 22 of honeycomb core 18. Adhesive sheet material 30 from adhesive sheet 46 carrying thermoplastic material 53 overlies first side surface 36 of wall 34 adjacent edge surface 32 and overlies second opposing side surface 38 of 34 wall adjacent edge surface 32 as seen in FIG. 13.

Subsequent to step 42 of positioning thermoplastic fabric sheet 20 in overlying relationship to honeycomb core 18, in this second example, which placed thermoplastic fabric sheet 20 in contact with adhesive sheet material 30 carrying thermoplastic material 53, step 44 of bonding structurally further includes a step of curing thermoplastic fabric sheet 20 and adhesive sheet material 30 carrying thermoplastic material 53. In the curing process, sandwich acoustic liner assembly 14, which in this example, includes face sheet 24 overlying thermoplastic fabric sheet 20, bond assembly 28 positioned between honeycomb core 18 and thermoplastic fabric sheet 20 with opposing face sheet (not shown) positioned on honeycomb core 18 is bagged, vacuumed and cured which results in curing thermoplastic fabric sheet 20 and adhesive sheet material 30 carrying thermoplastic material 53. A desired structural bonding occurs with respect to thermoplastic fabric sheet 20 and honeycomb core 18 providing a sandwich acoustic liner assembly 14. This liner is less expensive to fabricate based on this process and bond assembly 28, which includes the adhesive sheet material 30 and thermoplastic material 53, avoids unwanted wetting of the thermoplastic fabric sheet 20 and avoids blockage of perforations 26 of face sheet 24 and provides a beneficial structural bond.

While various embodiments have been described above, this disclosure is not intended to be limited thereto. Variations can be made to the disclosed embodiments that are still within the scope of the appended claims.

What is claimed:

1. A sandwich acoustic liner assembly, comprising:
   a honeycomb core; and
   a thermoplastic fabric sheet positioned in overlying relationship and structurally bonded with the honeycomb core with a bond assembly, wherein the bond assembly, comprises:
   an adhesive material positioned on an edge surface of a cell wall of the honeycomb core and onto a first side surface of the cell wall adjacent to the edge the honeycomb core; and
   a thermoplastic material, from a slurry of a mixture of a powder of thermoplastic material and a solvent, positioned between the adhesive material and the thermoplastic fabric sheet.

2. The sandwich acoustic liner assembly of claim 1, wherein the honeycomb core is constructed of a thermoset material.

3. The sandwich acoustic liner assembly of claim 1, further includes a face sheet having a plurality of perforations extending through the face sheet and the face sheet is positioned in overlying relationship to the thermoplastic fabric sheet such that the thermoplastic fabric sheet is positioned between the face sheet and the honeycomb core.

4. The sandwich acoustic liner assembly of claim 3, wherein the face sheet is constructed of a thermoset material.

5. The sandwich acoustic liner assembly of claim 3, wherein the thermoplastic fabric sheet is secured to the face sheet with an adhesive.

6. The sandwich acoustic liner assembly of claim 3, wherein the thermoplastic fabric sheet is secured to the face sheet with a portion of the thermoplastic fabric sheet fused to the face sheet.

7. The sandwich acoustic line assembly of claim 1, wherein the bond assembly is positioned between the thermoplastic fabric sheet and the honeycomb core.

8. The sandwich acoustic liner assembly of claim 6, wherein the thermoplastic fabric sheet is fused to the face sheet in discrete locations.

9. The sandwich acoustic liner assembly of claim 1, wherein the adhesive material extends from the edge surface of the cell wall onto a second opposing side surface of the cell wall adjacent the edge surface of the cell wall.

10. The sandwich acoustic liner assembly of claim 9, the bond assembly further includes the thermoplastic material, from the slurry of the mixture of the powder of thermoplastic material and the solvent, positioned in overlying relationship to the adhesive material positioned on the first side surface and on the second opposing side surface of the cell wall of the honeycomb core.

11. The sandwich acoustic liner assembly of claim 1, wherein the thermoplastic material, from the slurry of the mixture of the powder of thermoplastic material and the solvent, is positioned in overlying relationship to the adhesive material which is positioned on the edge surface of the cell wall of the honeycomb core.

12. A method for fabricating a sandwich acoustic liner assembly, comprising the steps of:
    positioning a thermoplastic fabric sheet in overlying relationship with a honeycomb core; and
    bonding structurally the thermoplastic fabric sheet to the honeycomb core with a bond assembly, wherein the bond assembly comprises:
    an adhesive material positioned on an edge surface of a cell wall of the honeycomb core and onto a first side surface of the cell wall adjacent to the edge the honeycomb core; and
    a thermoplastic material, from a slurry of a mixture of a powder of thermoplastic material and a solvent, positioned between the adhesive material and the thermoplastic fabric sheet.

13. The method for fabricating the sandwich acoustic liner assembly of claim 12, wherein the step of positioning further includes a step of securing the thermoplastic fabric sheet to a face sheet constructed of a thermoset material wherein the face sheet defines a plurality of perforations which extend through the face sheet.

14. The method for fabricating the sandwich acoustic liner assembly of claim 13, wherein the step of securing includes a step of one of positioning an adhesive between the face sheet and the thermoplastic fabric sheet or fusing a portion of the thermoplastic fabric sheet to the face sheet.

15. The method for fabricating the sandwich acoustic liner assembly of claim 12, wherein the step of bonding further includes a step of positioning an adhesive sheet in overlying relationship with the honeycomb core prior to the step of positioning the thermoplastic fabric sheet.

16. The method for fabricating the sandwich acoustic liner assembly of claim 15, wherein the step of bonding further includes a step of heating the adhesive sheet, prior to the step of positioning the thermoplastic fabric sheet, resulting in the adhesive sheet altering configuration such that the adhesive sheet defines an opening aligned with an opening defined by walls which form a cell of the honeycomb core, wherein
    the adhesive material from the adhesive sheet overlies a first side surface adjacent the edge surface of the wall and a second opposing side surface adjacent the edge surface of the wall.

17. The method for fabricating the sandwich acoustic liner assembly of claim 16, the step of bonding further includes positioning a slurry of the mixture of the powder of thermoplastic material and the solvent onto the adhesive material, prior to the step of positioning the thermoplastic fabric sheet, such that with the step of positioning the thermoplastic fabric sheet in overlying relationship with the honeycomb core the thermoplastic fabric sheet is positioned overlying the thermoplastic material carried by the adhesive material.

18. The method for fabricating the sandwich acoustic liner assembly of claim 17, wherein the step of bonding further includes a step of curing the thermoplastic fabric sheet and the adhesive material carrying the thermoplastic material positioned on the honeycomb core.

19. The method for fabricating the sandwich acoustic liner assembly of claim 12, wherein the step of bonding further includes a step of applying a slurry of the mixture of the powder of thermoplastic material and the solvent onto an adhesive sheet, prior to the step of positioning the thermoplastic fabric sheet.

20. The method for fabricating the sandwich acoustic liner assembly of claim 19, prior to the step of positioning the thermoplastic fabric sheet, the step of bonding further includes a step of heating the adhesive sheet carrying the thermoplastic material, from the slurry of the mixture of the powder thermoplastic material and the solvent, resulting in altering configuration of the adhesive sheet carrying the thermoplastic material such that the adhesive sheet carrying the thermoplastic material forms an opening aligned with an opening defined by the walls which form a cell of the honeycomb core, wherein:

the adhesive material from the adhesive sheet carrying the thermoplastic material overlies an edge surface of a wall of cell of the honeycomb core;

the adhesive material from the adhesive sheet carrying the thermoplastic material overlies a first side surface of the wall adjacent the edge surface and overlies a second opposing side surface of the wall adjacent the edge surface; and subsequent to the step of positioning the thermoplastic fabric sheet in overlying relationship to the honeycomb core which placed the thermoplastic fabric sheet in contact with the adhesive material carrying the thermoplastic material, the step of bonding further includes a step of curing the thermoplastic fabric sheet and the adhesive material carrying the thermoplastic material positioned on the honeycomb core.

\* \* \* \* \*